United States Patent [19]

Tischer et al.

[11] Patent Number: 4,495,769
[45] Date of Patent: Jan. 29, 1985

[54] BOOSTER POWER STEERING

[75] Inventors: Werner Tischer, Böbingen; Karl-Heinz Liebert, Schwäbisch Gmünd; Rolf Fassbender, Mutlangen, all of Fed. Rep. of Germany

[73] Assignee: Zahnradfabrik Friedrichshafen, AG., Friedrichshafen, Fed. Rep. of Germany

[21] Appl. No.: 292,632

[22] Filed: Aug. 13, 1981

[30] Foreign Application Priority Data

Aug. 19, 1980 [DE] Fed. Rep. of Germany ....... 3031230

[51] Int. Cl.³ ............................................. F16D 31/02
[52] U.S. Cl. ........................................ 60/451; 60/384
[58] Field of Search ................ 60/384, 386, 451, 446; 180/132

[56] References Cited

U.S. PATENT DOCUMENTS

| | | | |
|---|---|---|---|
| 3,249,173 | 5/1966 | Gordon | 60/384 |
| 3,587,235 | 6/1971 | Goff | 60/384 |
| 4,165,761 | 8/1979 | Budzich | 91/446 |
| 4,371,002 | 2/1983 | Tischer | 60/384 |

Primary Examiner—Stephen F. Husar
Attorney, Agent, or Firm—Zalkind & Shuster

[57] ABSTRACT

A control valve for booster power steering has a back pressure check valve openable by pressure caused by wheel jolting, which check valve connects between a servopump pressure passage of the control valve through the inner bore of a valve sleeve operable within a housing bore to the inlet of a metering pump. Such valve ensures that the steering is "closed" under all circumstances including during steering to prevent pressure jolts being transmitted from the vehicle wheels due to road roughness. However, after completion of a steering operation high pressure can build up within the valve sleeve causing expansion of the valve sleeve and jamming within the housing bore, making operation difficult. Accordingly, a pressure limiting valve is provided connected to relieve the pressure within the valve sleeve bore.

2 Claims, 1 Drawing Figure

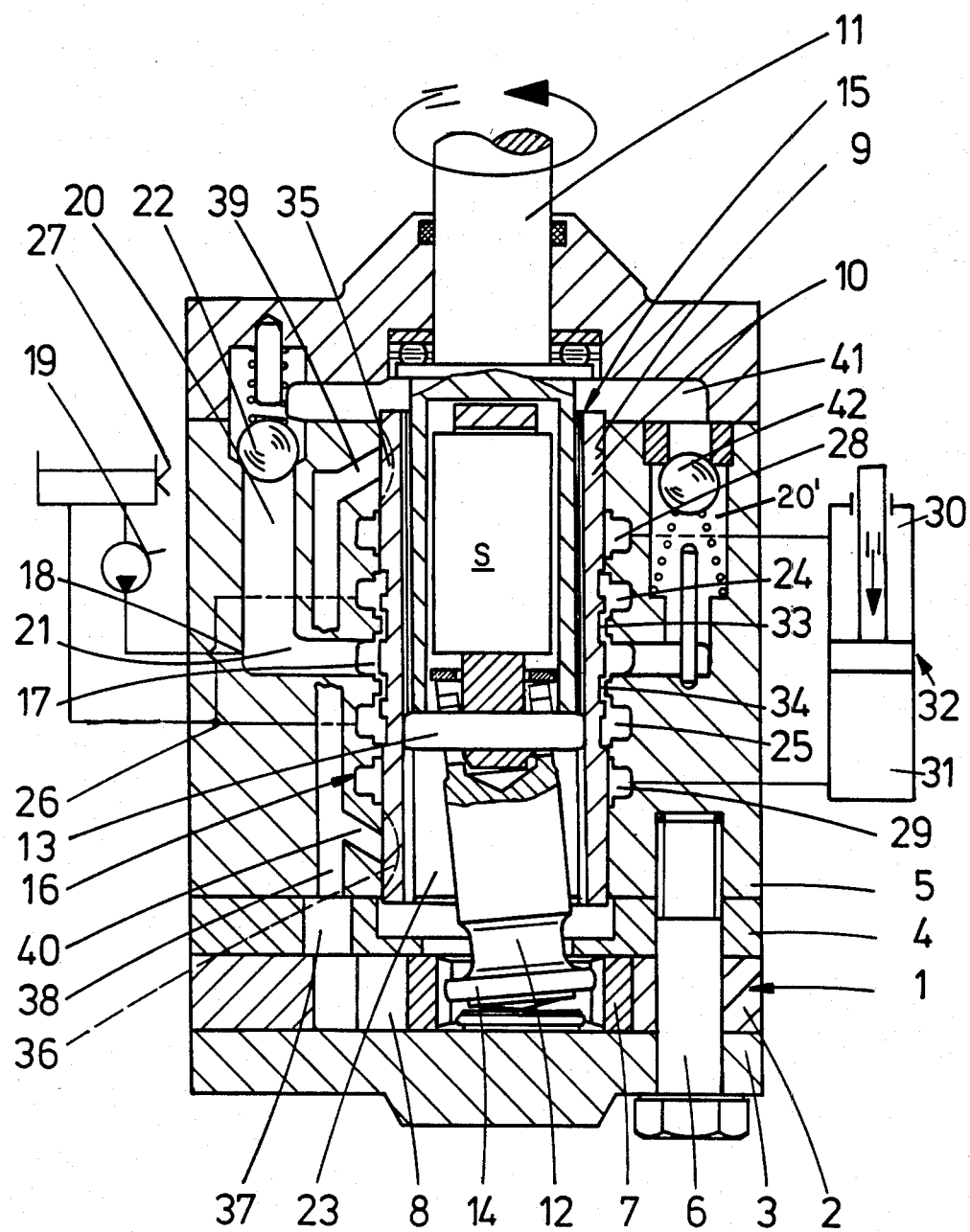

BOOSTER POWER STEERING

BACKGROUND

It has heretofore been known to provide a booster steering control valve of the kind which utilizes a metering pump which receives high pressure from an engine driven pump to meter flow via a metering pump to a servomotor, responsive to being rotated by rotation of a vehicle steering wheel. In such construction the valve comprises a housing with a valve sleeve therein and various passages and grooves so that actuation of the valve sleeve by rotation of the vehicle steering wheel brings into selective connection various grooves and passages to control flow to and from the chambers of a double acting servomotor. It has also been known to provide a back pressure valve in a high pressure passage of the housing to which passage the servopump connects. Such back pressure valve is normally closed when the valve is in neutral position and pressure from a servopump is bypassed through the valve to a tank, but can open during steering to permit flow to the metering pump through the valve sleeve. The purpose of the back pressure valve is to insure that the pressure circuits for steering are "closed" under all circumstances including when the steering operation is taking place and prevents road roughness jolts on the vehicle wheels from being transmitted through the valve to the steering wheel.

In general, the clearance between the valve sleeve and the housing is very small and the pressure within the valve sleeve serves to maintain such clearance to a minimum for avoidance of leakage.

A control valve of the above description is shown in brochures entitled "Der Neue ZF-Servostat" published March 1980 and "ZF-Servostat 2" published by Zahnradfabrik Friedrichshafen AG in September of 1980, and identified as publication No. G 8470 D-SL. Other background information is found in U.S. Pat. Nos. 4,174,612; 4,193,471; and 4,258,752.

Due to the effect of driving with road surface forces upon the vehicle wheels, there can occur after completion of a steering operation, a partial pressure effect upon the valve sleeve while at the same time there is a considerable drop in delivery pressure from the servopump. This is caused by the fact that the interior pressure in the valve sleeve cannot be reduced since it is blocked at the back pressure valve from connection to the pressureless flow path of hydraulic oil in the neutral position of the valve. While the back pressure valve, being a non-return valve, prevents road jolts against the vehicle wheels from reaching the steering wheel, the blocking of a balancing pressure causes the partial pressure to occur within the valve sleeve. Since the usual working pressures of hydraulic booster systems are high the valve sleeve becomes deformed and can jam within the housing.

BRIEF DESCRIPTION OF THE INVENTION

The invention provides a pressure limiting valve arranged in parallel with the back pressure valve, but opening in the opposite direction to relieve pressure or at least limit it to a predetermined value within the valve sleeve. Such value can be selected so that no noticeable leaks due to clearance losses occur with respect to the rotary gear of the metering pump and as so that no expansion of the valve sleeve can occur to cause jamming.

The arrangement is such that the back pressure valve opens toward a chamber connecting with the bore of the valve sleeve through which bore oil flows to a metering pump, but the pressure limiting valve opens in an opposite direction in communication with that chamber so that undesired pressure inside the valve sleeve can communicate through the chamber to the pressure limiting valve and back to the high pressure passage of the valve housing.

A detailed description of the invention now follows in conjunction with the appended drawing which illustrates a longitudinal section of the valve of the invention in neutral position showing essentially all conventional components and including the novel feature of the pressure limiting valve.

Referring to the drawing, a metering pump 1 is disclosed having the internal gear ring 2 intermediate the housing cover 3 and a cheek plate 4 all assembled to a housing 5 wherein the cover is fastened by screw 6 through the cheek plate to the housing. The metering pump external gear 7 will be understood to have one less tooth than the internal gear ring 2 wherein displacement cells 8 are formed between the gear rings 2 and 7, cover 3 and cheek plate 4 in the usual manner.

Housing 5 has an interior bore 9 to accommodate a rotatable and axially movable valve sleeve 10 coaxial with a steering shaft 11 understood to be connected to a steering wheel. Valve sleeve 10 can rotate the inner gear 7 through a universal shaft 12 wherein pins 13 and 14 effect a universal motion between internal gear 7, drive shaft 12, and valve sleeve 10.

The valve sleeve is concentrically spaced from the hollow end of shaft 11 to form a flow passage, having a bore 23 for such purpose, and axial motion controls flow directions.

By well known means valve sleeve 10 is axially movable when rotated by shaft 11 through pin 13 which engages in a coarse thread (not shown) of the bore 23 of the valve sleeve. The rotative limits of the valve sleeve are effected in the usual manner (not shown) and axial limits are effected by a lost motion coupling 15.

The housing 5 and valve sleeve 10 comprise the flow control valve 16 wherein a housing pressure inlet groove 17 is centrally located and connects via external connection 18 to the servopump 19. Pressure passage means comprising passages 20 and 21 communicate with conduit means for flow from servopump 19 to pressure groove 17 and to the back pressure valve 22 which closes the pressure passage 20, but can open to permit flow therethrough to the valve sleeve bore 23 and thence to the inlet of the metering pump 1.

Exhaust return grooves 24 and 25 of the housing are on respective sides of pressure groove 17 and communicate with a passage 26 for flow to an oil tank 27. Grooves 28, 29 beyond respective return grooves 24 and 25 connect to respective chambers 30, 31 of servomotor 32. The valve sleeve 10 has the usual grooves 33 and 34 which in neutral position permit pressureless bypass circulation of oil from the servopump 19 to the oil tank 27, but when the valve sleeve is axially displaced, such bypass is shut off and communication set up, in the usual manner, for pressure flow to one servomotor chamber while exhausting the other, via grooves 28, 29 and return grooves 24, 25 in conventional manner, while return to neutral position is effected by leaf spring means S of known arrangement.

Two arrays of longitudinal distributor grooves 35 and 36 are provided spaced around the circumference and adjacent the ends of the valve sleeve 10. The length of these grooves is axially limited so that their ends form flow control edges which coact with adjacent housing grooves.

In neutral position of sleeve 10 there is no flow from the distributor grooves 35 or 36. In a steering position of the valve sleeve, dependent upon direction of steering which governs direction of axial movement of the valve sleeve, one set of grooves 35 communicates with pressure passage 21 or with the servomotor groove 28, respectively, and the other set of grooves 36 communicates with pressure passage 21 or with servomotor groove 29, respectively.

The displacement cells 8 of the metering pump communicate with the sets of the distributor grooves 35 and 36 via channels 37 of the cheek plate 4 and thence through axial channels 38 and passages 39 or 40, respectively, to distributor grooves 35 and 36. The arrangement of channels 37 and passages 38 is well-known from German DE OS No. 27 18 148 and need not be described in detail. The number of axial channels 38 corresponds to the number of spaces between the teeth of the external gear ring 2.

The particular invention resides in the provision of a pressure limiting valve 42 in a passage 20' of the housing which is intermediate pressure passage 21 and a housing chamber 41 communicating with the bore 23 of the valve sleeve 10 of the flow control valve 16. Pressure limiting valve 42 operates in parallel with the back pressure valve 22 which closes off pressure passage 20, in neutral position but which opens into chamber 41. However, the opening direction of the pressure limiting valve 42 is opposite to the opening direction of the back pressure valve 22. When pressure limiting valve 42 is opened by pressure in bore 23, such pressure is relieved to the pressure passage 21 when there is pressure buildup inside bore 23. Accordingly, such pressure buildup is limited and expansion of the valve sleeve which would otherwise cause jamming and erratic steering is prevented.

We claim:

1. A booster steering valve comprising a housing (5) with a valve sleeve (10) therein having an inner bore (23) and being actuatable relative to said housing responsive to operation of a manually operable steering shaft (11) wherein said housing and valve sleeve have coacting passages and grooves for controlling pressure and exhaust flow to and from the chambers of a servomotor including a servopump pressure groove (17) in said housing; further including a metering pump (1) actuated by operation of said steering shaft; said housing and valve sleeve having a neutral position wherein pressure flow from said servopump is bypassed to a tank from said pressure groove; and wherein said housing has a servopump pressure passage means (20, 21) with a back pressure valve (22) therein openable in one direction by pressure in said pressure passage means to the inlet of said metering pump via said valve sleeve bore;

the improvement comprising:

a passage means (20') having a connection from said pressure passage means to the downstream side of said back pressure valve (22) and having a pressure limiting valve (42) in said connection to be openable in an opposite direction by pressure in said valve sleeve bore (23) to relieve pressure therein to said pressure passage means in a neutral position of said valve.

2. A booster steering valve as set forth in claim 1, said correction comprising a chamber (31) connecting with said valve sleeve bore (23); said chamber being downstream of said back pressure valve (22) and said back pressure valve opening into said chamber from said high pressure passage; said pressure limiting valve (42) opening in an opposite direction from said chamber to said pressure passage means (20, 21).

* * * * *